US006564118B1

(12) United States Patent
Swab (10) Patent No.: US 6,564,118 B1
(45) Date of Patent: May 13, 2003

(54) SYSTEM FOR CREATING CUSTOMIZED PATTERNS FOR APPAREL

(76) Inventor: Priscilla Swab, 2913 S. Mock Ave., Muncie, IN (US) 47302

( * ) Notice: Subject to any disclaimer, the term of this patent is extended or adjusted under 35 U.S.C. 154(b) by 184 days.

(21) Appl. No.: 09/750,633

(22) Filed: Dec. 28, 2000

(51) Int. Cl.[7] .............................................. G06F 17/60
(52) U.S. Cl. ...................... 700/131; 700/130; 700/132; 700/134
(58) Field of Search ............................... 700/131, 132, 700/130, 134

(56) References Cited

U.S. PATENT DOCUMENTS

| | | | | |
|---|---|---|---|---|
| 3,899,949 A | * | 8/1975 | Bystron et al. ................. 33/12 |
| 4,546,434 A | * | 10/1985 | Gioello ........................ 700/132 |
| 4,598,376 A | * | 7/1986 | Burton et al. ................. 33/17 A |
| 4,677,564 A | | 6/1987 | Paly et al. .................... 364/468 |
| 4,811,243 A | * | 3/1989 | Racine ........................ 345/863 |
| 4,916,624 A | * | 4/1990 | Collins et al. ............... 700/132 |
| 5,163,006 A | * | 11/1992 | Deziel ........................ 345/629 |
| 5,341,305 A | * | 8/1994 | Clarino et al. .............. 700/132 |
| 5,463,724 A | * | 10/1995 | Anderson et al. ........... 707/503 |
| 5,515,268 A | | 5/1996 | Yoda .......................... 364/401 |
| 5,548,519 A | | 8/1996 | Park et al. .............. 364/470.06 |
| 5,559,709 A | * | 9/1996 | Ohno et al. .................. 382/111 |
| 5,680,314 A | * | 10/1997 | Patterson et al. ........... 700/132 |
| 5,757,661 A | * | 5/1998 | Surville ....................... 700/131 |
| 5,768,135 A | | 6/1998 | Park et al. .............. 364/470.01 |
| 5,960,411 A | * | 9/1999 | Hartman et al. ............ 345/962 |
| 6,353,770 B1 | * | 3/2002 | Ramsey et al. ................ 33/12 |

* cited by examiner

*Primary Examiner*—Leo Picard
*Assistant Examiner*—Michael D. Masinick
(74) *Attorney, Agent, or Firm*—Woodard, Emhardt, Naughton, Moriarity & McNett LLP (57) ABSTRACT

The present invention is a system allowing an individual to order a customized pattern of a garment at an affordable cost. The system comprises a central computer system located at a vendor site communicatively linked to at least one local customer computer station. The system further comprises an apparel design selecting and pattern drafting software program, which is specially created to control the sequential operation of the pattern ordering and drafting processes, operating within the central computer station. A customer who wishes to order a customized pattern can simply access the central computer system from a local station, and will then be guided by the software program via a menu dialogue to select a garment design and input the necessary and desired information to enable the program to adjust size and design features to the customer's specifications. The customer has complete freedom of specifying a set of body measurements and garment features upon which a pattern will be drafted. The software program then executes the appropriate pattern drafting commands to create a pattern customized to the requests of the customer.

13 Claims, 7 Drawing Sheets

SYSTEM FOR CREATING CUSTOMIZED PATTERNS FOR APPAREL

FIELD OF THE INVENTION

This invention relates generally to a system for creating and ordering patterns of selected apparel designs, in particular, for creating patterns that are customized to body measurements specified by the customer.

BACKGROUND OF THE INVENTION

Patterns for apparel available from commercial vendors are generally limited to specific sizes or size classes (e.g., small, medium, large). These sizes or size classes are usually based on the average body dimensions of a target population for whom the apparel is designed. However, many individuals within this target population find that their body shapes or sizes do not match the standard body dimensions in all aspects. When selecting a paper pattern for apparel, these individuals usually have to settle for a size or size class that fits in an overall manner, but is not optimized for their particular body dimensions. Consumers who desire a better fit will have to make alterations or adjustments to these purchased patterns. Most paper patterns incorporate instructions or guides to make some simple adjustments for major body measurements, such as varying the length of the finished garment or the length of the sleeves. Any alterations outside these simple adjustments must be made solely by the knowledge and the skill of the consumer. Many consumers may not possess the skills necessary to make such alterations, or the alterations can be difficult and time consuming, which defeats the general purpose of using a purchased pattern as a template for making a garment. Therefore, it would be desirable for consumers to be able to purchase patterns that are custom-tailored to their individual body dimensions, that incorporate specific fashion attributes of a consumer, and that is available at a reasonable cost. The present invention, directed to the creation of custom-drafted patterns for garments, satisfies this need.

SUMMARY OF THE INVENTION

The customized apparel pattern creation system of the present invention comprises a pattern selecting and drafting software program which controls the sequential operation of the pattern ordering and creation procedure. The pattern selecting and drafting software program is adapted to execute within a central processor of a computer assembly. The computer assembly may be a stand-alone system or a central computer communicatively linked to multiple local workstations. A customer at a retail store that has a local computer workstation can access the central computer. A design database containing a multiplicity of garment design profiles is accessible to the central processor of a computer system of the present invention. Each of the design profiles includes a design of a garment and a set of commands to construct a pattern for that garment. The customer may, through a series of menu steps, choose an apparel design, input the specific body measurements of a target individual (the individual for whom the garment is to be made), and order a paper pattern of that apparel. Upon receipt of the order, the computer assembly would draft a pattern which would be custom-tailored to the specified body dimensions of the target individual for delivery to the customer.

An object of the present invention is to enable individual consumers to order patterns specifically customized to the particular body measurements provided by the consumers, and do so at a reasonable cost.

Another object of the present invention is to enable customers to select apparel designs from a design database, or combine style features of different designs to create a personalized design and have a clothing pattern drafted for the selected design.

A further object of the present invention is reducing inventory and stocking cost for the apparel pattern vendors.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of modifications in various obvious respects, all without departing from the invention. Consequently, the drawing and description are to be regarded as illustrative in nature, and not as restrictive.

DETAILED DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such as alterations and further modifications in the illustrated device, and such further applications of the principles of the invention as illustrated therein being contemplated as would normally occur to one skilled in the art to which the invention relates are also included in the present invention.

The present invention takes advantage of advances in computer and telecommunication technology which allows the storage of large databases in a central location and the retrieval of the stored information at high speed by a consumer at a remote location. These features enable a customer located anywhere that the communication link reaches to select an apparel design and order a paper pattern which will be drafted and printed to fit the body dimensions specified by the customer. For simplicity, "vendors" mean designers, manufacturers, distributors, resellers and the like hereinafter.

Figure 1:
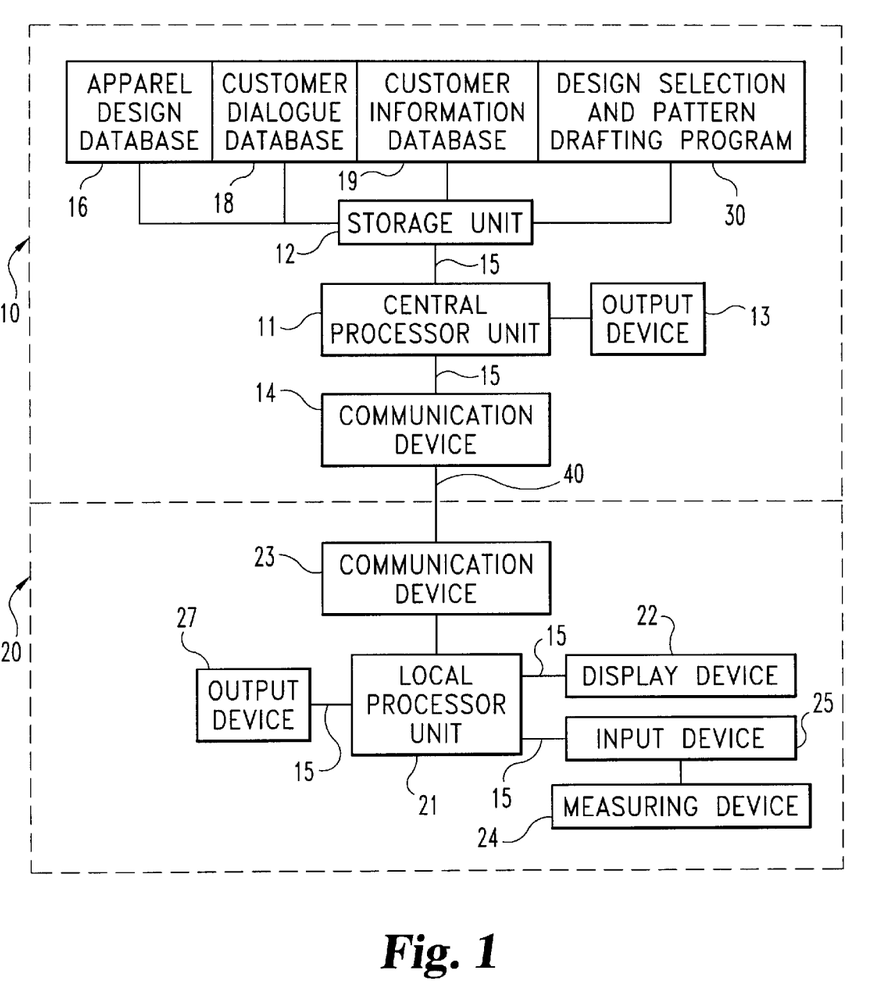
FIG. 1 is a block diagram illustrating the apparel design selecting and pattern drafting system in accordance with the present invention comprising a central computer in the vendor site, communicatively linked to a local computer system.

Referring to FIG. 1, a central computer assembly or system 10 at a vendor site with a communication link 40 connects the central computer assembly 10 to a local computer assembly or system 20 for the exchange of customer and product information. Communication link 40 can include any conventional communication device which can transfer large amounts of data efficiently, such as telephone lines, cable lines, optical fibers or wireless systems that may utilize satellites. While a separate central computer assembly 10 and a local computer assembly or system 20 are being illustrated, it is contemplated that one computer assembly located at a local site can perform all the functions of the central and local computer assemblies combined. It is also contemplated that a consumer may access the central computer assembly 10 from his personal computer through a communication link, such as the internet, for example.

The central computer assembly 10 is of conventional design, and comprises a central processor unit 11, a storage device 12, an output device 13, a communication device 14, and interface cables or connection links 15 which connect the peripheral devices to central processor unit 11. Central processor unit 11 controls all of the operations of the central computer system 10 and is preferably capable of high speed operations. Storage unit 12 is designed for the storage of databases, such as the stock of various apparel designs and individual customer information and profiles. In the illustrated embodiment, storage unit 12 is a stack of optical disks operating in an optical disk drive having high-speed sampling capability. Other high-capacity storage devices can also be used. Printing of the drafted paper pattern is through output device 13 which, in the illustrated embodiment, is an oversized graphics printer. Any printing devices capable of handling the large sheets of paper on which the apparel patterns are to be printed can be used. Output device 13 preferably includes adequate buffer memory for storing the entire drafted patterns transmitted from the central computer system 10, in the event that output device 13 is located at a site different than that which houses the central processor unit 11. Communication device 14 couples to the communication link 40 and transmits and receives information to and from the local computer station 20. In the illustrated embodiment, communication device 14 is a high speed telephone modem, but may comprise other equipment, such as a cable modem, or a satellite up-link transmitter. Interface cables 15 connecting the peripheral devices 12, 13, and 14 to processor unit 11 are illustratively shown as conventional computer interface cables.

Similar to central computer assembly 10, the local computer station or assembly 20 is also of conventional design comprising a local processor unit 21 for controlling the operations of the local computer assembly, display monitor 22, an input device 25 and a communication device 23. The local processor unit 21 is preferably capable of high speed operation. The display device 22 as illustrated is a conventional monitor having adequate resolution to clearly display apparel photographs and designs. Input device 25 allows a customer to input product and customer related information to local processor unit 21. Input device 25 can be any of the conventional devices, such as a keyboard, a touch pad, a writing pad, a mouse, a voice recognition unit, an automatic body shape scanner, or any combination of the above. Communication device 23 in the illustrated embodiment is a high speed telephonic modem, but can be any device capable of transmitting and receiving information through the communication link 40. It is preferable that the local computer assembly 20 also be equipped with an output device 27, which would substantially expedite the delivery of the drafted patterns to the customer and could obviate the need for output device 13. Output device 27 is similar to output device 13 which has been described previously. In one embodiment of the present invention, the local computer station 20 also includes a measuring device 24 which affords added convenience to the customer. Measuring device 24 is capable of measuring the body dimensions of a customer and is coupled to input device 25 for automatic transmission of the body measurements to local processor unit 21. Measuring device 24 may be an optical shape sensor for measuring body shapes. The detail of the operation of such an optical shape sensor has been described in U.S. Pat. No. 5,515,268 and is hereby incorporated by reference. The shape sensors are capable of sensing three-dimensional surfaces. Measuring device 24 may also be a much simpler device capable of linear measurements only.

Central to the present invention is an apparel design selecting and pattern drafting software program 30. Apparel design selecting and pattern drafting program 30 is adapted to execute within central processor 11, and controls the sequential operation of selecting an apparel design and drafting of a paper pattern. The step sequence of design selecting and pattern drafting program 30 will be discussed later.

Figure 2:
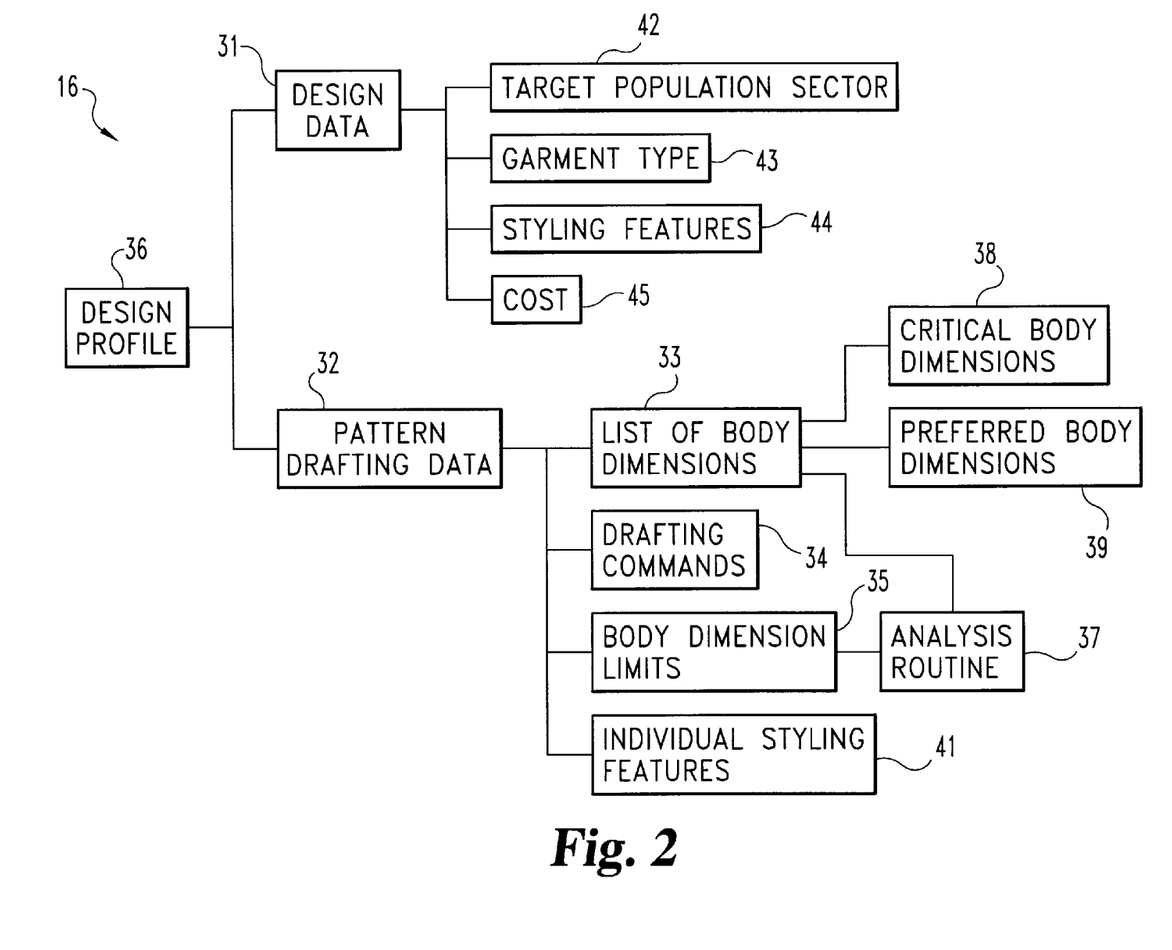
FIG. 2 is a block diagram demonstrating the organization of information composing fthe design database.

Another key feature of the present invention is an apparel design database 16. As illustrated in FIG. 2, apparel design database 16 comprises a multiplicity of individual garment design profiles 36. Each garment profile 36 includes design data 31 and pattern drafting data 32. Design data 31 includes general garment design information, including target population sector information 42 (e.g., male, female, age categories for whom the garment is designed), garment type 43 (e.g., shirt, skirt, trousers, etc), special styling features 44 (e.g., puff sleeves, trouser legs that flare, fabric choices and/or recommendation), and the cost 45 of producing a pattern. The data is coded such that it can be sorted and easily retrieved at a later time. Pattern drafting data 32 for drafting a pattern of a garment includes a list of body dimensions 33, a set of drafting commands 34, a set of body dimension limits 35, and a set of individualized styling features 41. The list of body dimensions 33 includes those critical body measurements 38 without which the construction of a customized pattern would be impossible. Examples of critical body measurements are the waistline for a pair of trousers, shoulder widths for a jacket, etc. The consumer must supply the critical measurements 38. The list of body dimensions 33 also includes those preferred body measurements 39 which make a pattern more individualized. Examples of preferred body measurements are length of a sleeve or a skirt, which can be varied by the consumer for each garment. The preferred body measurements 39 may be supplied from design data 31 using target population standards if the consumer chooses not to supply the measurements. The individualized styling features 41 may include, for example, variations from the standard garment design, such as three-quarter sleeves rather than short sleeves.

The drafting command 34 is a set of sequential commands used to draft a reference pattern of the garment. As is typical in the pattern industry, after a garment design is made, an experienced pattern maker constructs a reference pattern using a set of body measurements of the target population and the assistance of a conventional apparel CAD (computer assist design) software program. The commands performed on the reference pattern are sequentially stored in memory as the drafting commands 34. The executed drafting commands 34 thus stored can be reproduced using different sets of body measurements in the same sequence as performed on the reference pattern to produce target patterns of various sizes. In addition to drafting the reference pattern, the pattern maker also develops a set of body dimension limits 35 within which the garment design is best portrayed. An analysis routine 37 compares body dimension limits 35 to the body dimensions 33 of a target individual and determines whether the chosen garment design is suitable for the body shape of the target individual, in order to insure that an aesthetically pleasing garment is created from the pattern. Analysis routine 37 may also include a visual comparison step of overlaying the selected garment design on a body model constructed from the body measurements of the target individual, and allows that visual representation to be shown to the consumer by way of a drawing, photograph, or image produced on a computer screen, for example.

A customer information database 18 stored within the storage unit 12 provides better service to repeat customers. The customer information database 18 contains the body dimensions of the customer, his preferences on fit (tight or loose, and sleeve lengths, trouser lengths, etc.) and preferred method of payment and other pertinent information. The customer information database 18 also contains information of target persons for whom the customer has previously ordered patterns. When the customer logs onto the central computer assembly 10, the central processor 11 retrieves the stored information, thus saving the customer from a need to reenter this information.

A customer dialogue database 19, also stored in the storage unit 12, contains customer menu forms for providing information to and requesting information from the customer during the pattern ordering process. The pattern ordering and creating program 30 selects different menu forms depending on the garment design being ordered.

Figure 3A:
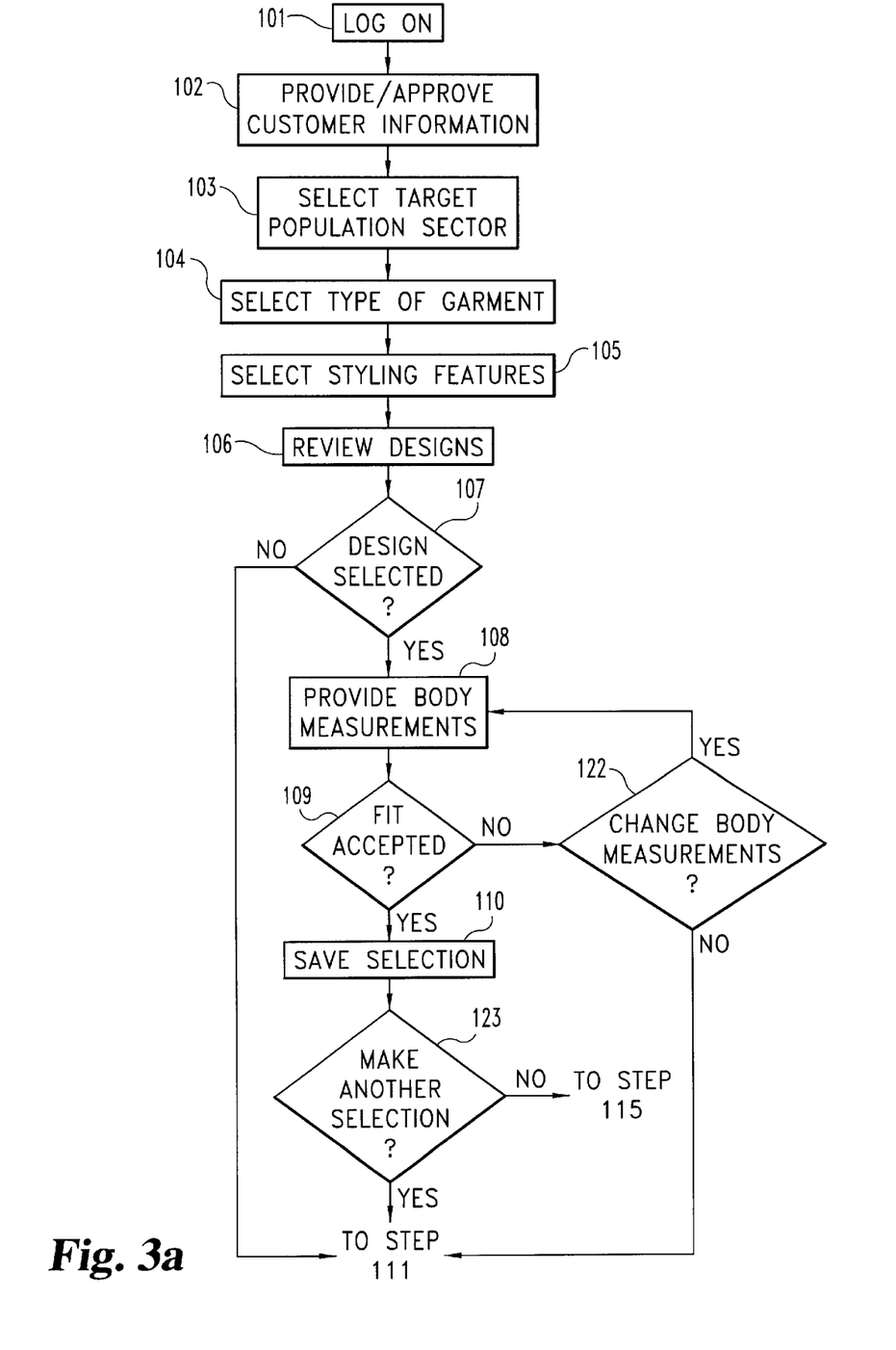
FIGS. 3a and 3b shows a typical dialogue sequence of apparel design selecting and pattern drafting process.
Figure 3B:
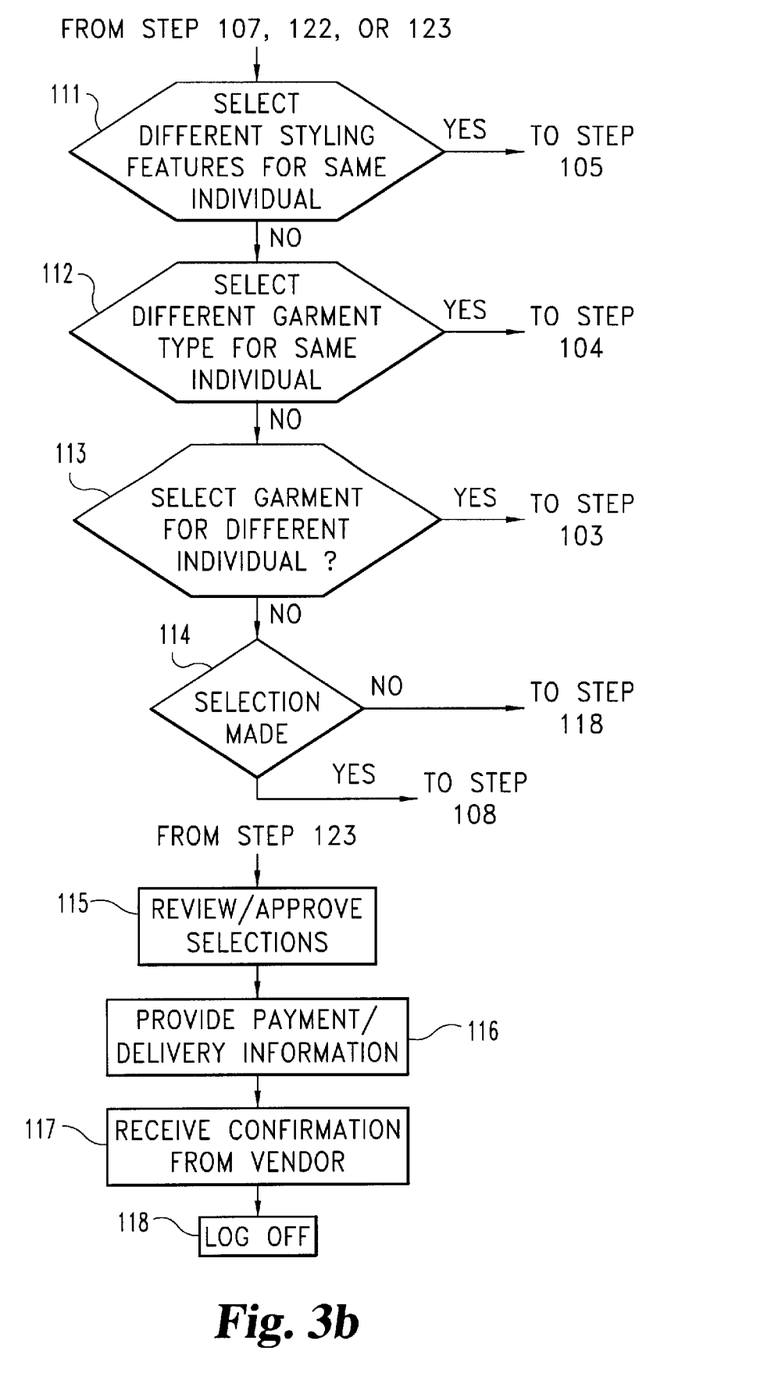
Figure 4A:
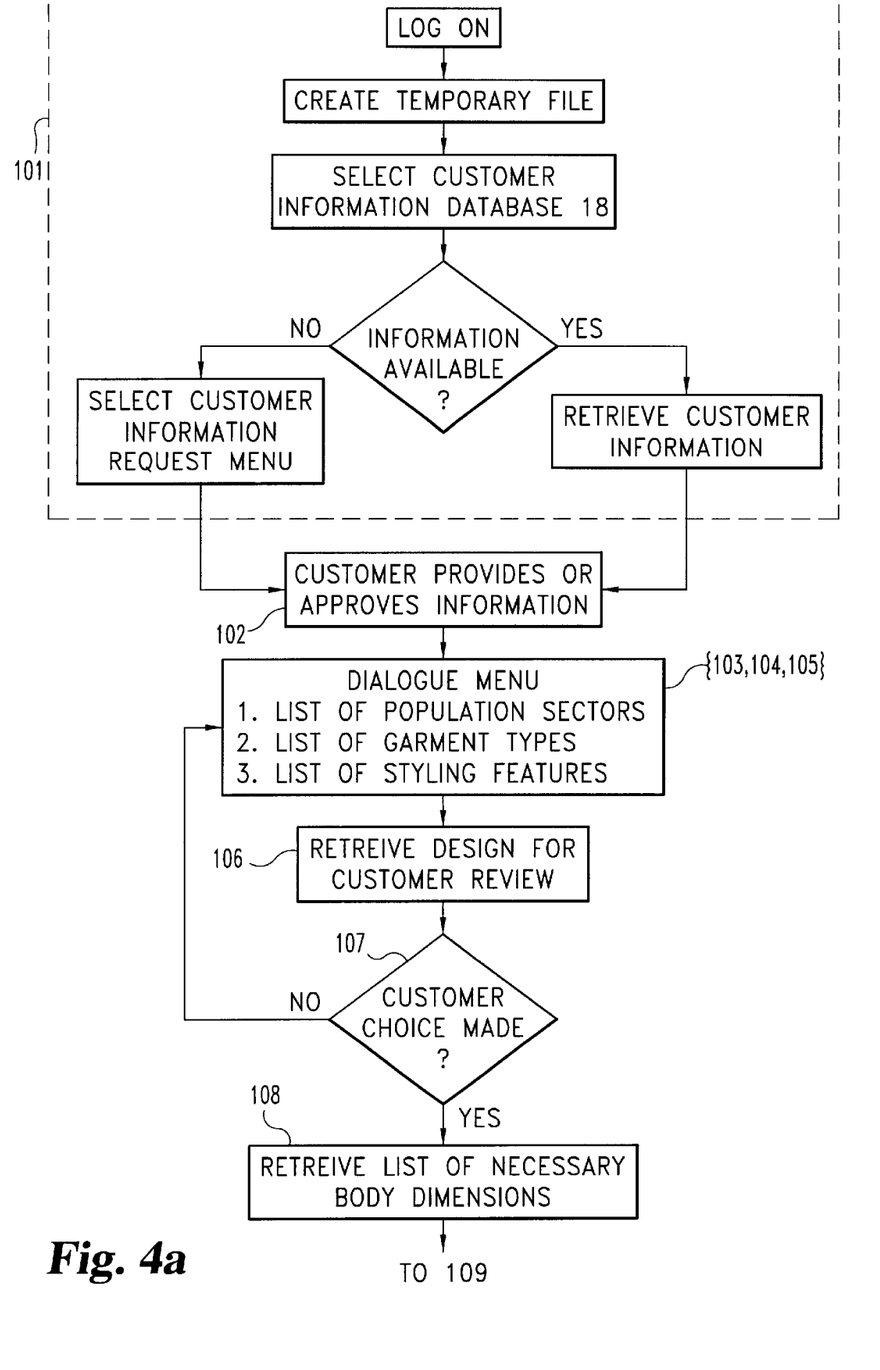
FIGS. 4a, 4b, and 4c is a flow diagram of the decision making process of the central computer.
Figure 4B:
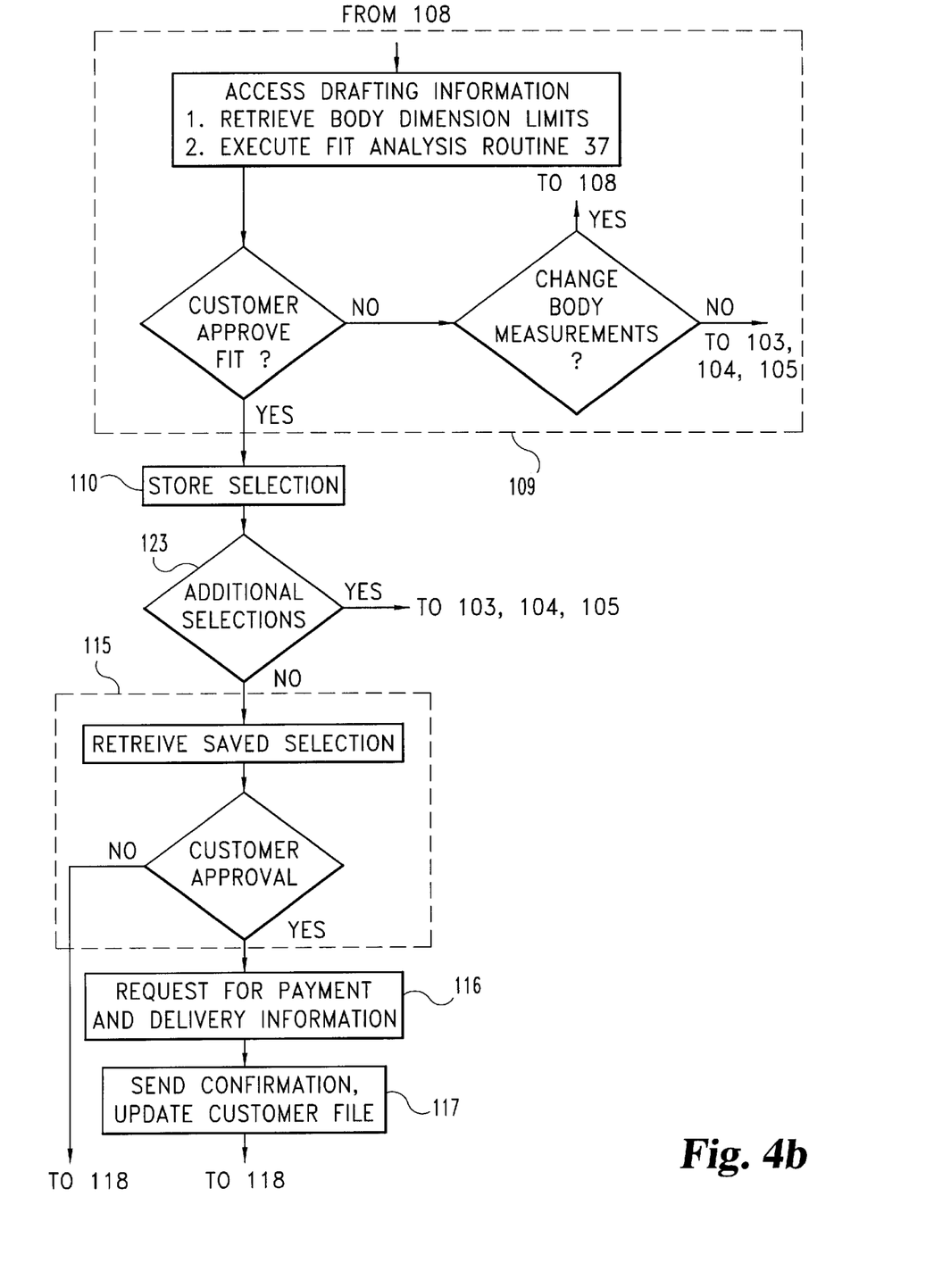
Figure 4C:
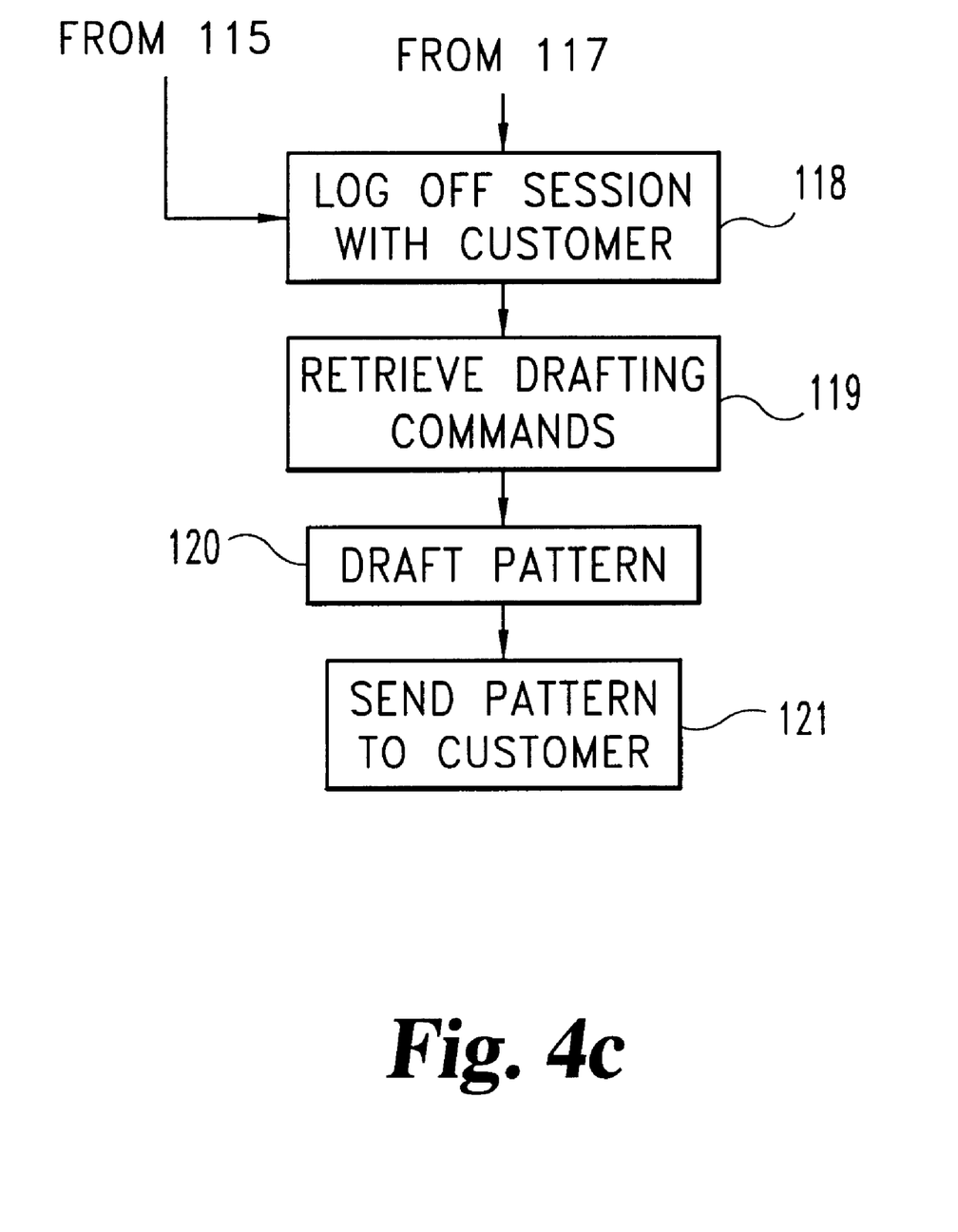

FIG. 3 shows a typical dialogue sequence which a customer experiences during the apparel design selecting and pattern ordering process. FIG. 4 lists the pertinent operations exercised by the design selecting and pattern drafting program 30 during the process. The ordering process initiates at step 101, when a customer logs onto the central computer assembly 10 from a local computer station 20. Apparel design and pattern drafting program 30 creates a temporary file for the session. Apparel design and pattern drafting program 30 also searches customer information database or data file 18 and retrieves the customer's data file, if available. At step 102, the customer is requested to provide personal information or to approve information retrieved from customer information database 18. Apparel design and pattern drafting program 30 is capable of distinguishing a repeat customer from a new customer when requesting information. For a repeat customer, apparel design selecting and pattern drafting program 30 automatically enters information for that customer from the stored customer data file 18. The customer is given an opportunity to review and change any information previously entered, and data file 18 is then updated with the changed information. At steps 103–105, the customer specifies the target individual's (for whom the pattern is ordered) population sector (e.g., age and gender), as well as the type and style of the garment desired. Apparel design selecting and pattern drafting program 30 searches design database 16 and retrieves the designs that meet the combined criteria. At step 106, the customer reviews the retrieved designs. The customer may choose from the available designs or the customer may mix style features from different designs to create a personalized design. In one embodiment, the consumer may directly adjust or select design attributes via a computer screen using a mouse, by using a drag and drop feature, for example. At step 107, the customer is asked whether a design has been decided upon. If the answer is no, program 30 moves to step 111 and allows the customer to enter different selection criteria and repeats the selection process. If the answer is yes, program 30 continues to step 108. At step 108, apparel design selecting and pattern drafting program 30 retrieves the list of required body dimensions 33 for the selected garment design and requests the customer to provide the specific measurements 38 and 39 for these body dimensions 33. The customer may enter these body measurements manually or, in the case of a repeat customer, simply verify the information retrieved from the customer data file 18. In one embodiment of the present invention, the data input device 25 is coupled to a measuring device 24 which senses the body measurements of the customer and directly enters the measurements to the computer automatically. The customer will be asked either to supply or approve each of the critical measurements 38 without which the construction of a customized paper pattern would be impossible.

Preferred body measurements 39 make the pattern more individualized. The preferred body measurements 39 may be supplied as measurements in reference to a specific body point; e.g., the customer may specify that a sleeve extend to one inch from the elbow. Alternatively, the customer may dictate the dimension of the finished garment; e.g., the customer may specify that a sleeve extend eight inches from the shoulder seam. If the customer chooses not to supply preferred body measurements 39, the apparel selecting and pattern drafting program 30 will provide the data from design data 31, assuming target population body type and size standards from the target population sector information 42. At step 108, the customer may also select fabric type, color and pattern. Program 30 may also provide instructions for matching fabric patterns within the garment, or may print the pattern directly on the fabric itself, so that the pattern of the fabric is automatically matched when the garment pieces are sewn together.

The customer may change any of the standard information. Any measurement that is specifically entered by the customer will override computer provided measurements such that the customer has complete freedom to specify the body measurements needed to prepare the pattern. When the customer is satisfied with the body measurements entered, program 30 moves on to step 109.

At step 109, apparel selection and pattern drafting program 30 executes analysis routine 37 to determine whether the given set of body measurements 33 is within body dimension limits 35 set by the pattern drafter. Apparel design selecting and pattern drafting program 30 informs the customer of one of the three probable results: 1) the pattern can be drafted and the finished garment will be within the design criteria, 2) the pattern can be drafted, but because some measurements are outside the design criteria, the finished garment may not look true to the design, or 3) the pattern cannot be drafted because the body measurements are outside the design range and would conflict with some design criteria. In one embodiment of the present invention, the analysis routine 37 includes a visual routine to aid the customer for making the decision. The visual routine preferably produces an overlay image of a rendering of the finished garment with the selected measurements onto a three-dimensional body model having the body measurements of the target individual. Program 30 may also automatically adjust the appearance and the pattern dimensions based on the type and weight of fabric selected at step 108. At steps 109 and 110, the customer is given the option of going forward with the order, rejecting the current design and making another selection, adjusting the body or garment measurements for a better fit, or terminating the session by logging off at step 118. The customer may choose to adjust the garment measurements at step 122, wherefore, the program returns to step 108, so that the customer may enter new measurements. Analysis routine 37 will then repeat with the new dimensions. At step 123, the customer may also make other selections after accepting the current selection. Apparel design selecting and pattern drafting program 30 simply saves the current selection and returns the customer to the selection sequence at step 111 where the customer may select a different style feature, a different type of garment at step 112, or make a selection for a different target individual at step 113, respectively. After a customer indicates at step 114 that she has made all the selections she wishes, at step 115 the customer is given the opportunity to review and approve the selections made. At step 116, program 30 requests payment and delivery information. At step 117, upon receipt and verification of payment information, program 30 issues a confirmation to the customer and terminates the session. The pattern ordering program 30 then retrieves drafting commands 34 at step 119 and drafts the patterns at step 120 for the designs selected. The drafted pattern may be delivered to the consumer (at step 121) via normal delivery channels or electronically if the local computer 20 is equipped with a suitable output device 27.

While the invention has been illustrated and described in detail in the drawings and foregoing description, these are to be considered as illustrative and not restrictive in character, it being understood that only one preferred embodiment has been shown and described and that all changes and modifications that come within the spirit of the invention are desired to be protected.

What is claimed is:

1. A system of creating customized patterns for selected apparel comprising:

a computer assembly including a processor unit, a storage unit, an input device and a display device;

a design database comprising a multiplicity of apparel design profiles, each of said design profiles including a plurality of garment features that forms the design of a garment, body dimensions required to draft a pattern for said garment, and commands for drafting said pattern for said garment; and an apparel selecting and pattern creation program adaptable for execution within said processor unit and accessing said design database to control sequential operation of an apparel selecting and pattern drafting procedure, thereby allowing a customer to select a garment design, modify and/or substitute one or more garment features, input body measurements of a target individual, and order a pattern of said garment custom tailored to said body measurements of said target individual and including said modified and/or substituted garment features.

2. The system of claim 1, wherein said computer assembly includes a central computer within which said processor is located, a remote computer station comprising said input and display devices, and a communication link connecting said remote computer station to said central computer.

3. The system of claim 2, wherein said communication link provides two-way information transfer.

4. The system of claim 1, wherein said computer assembly further includes a dialogue menu system accessible to said processor unit and including a multiplicity of different menu sheets for organizing information to be displayed to or requested from said customer.

5. The system of claim 1, wherein said computer assembly further includes a customer information database for storing information specified by said customer that is accessible by said apparel selecting and pattern drafting program to vary the operation of said apparel selecting and pattern drafting program for creating a pattern specific to said customer.

6. A method of creating a customized pattern of a selected design of a garment comprising:

providing a computer assembly, wherein said computer assembly includes a processor unit, a storage unit, an input device, a display device, and an output device;

providing a design database wherein said design database includes a multiplicity of apparel design profiles, each of said design profiles including a plurality of garment features that form one or more garment designs, body dimensions required to draft a pattern for said garments, and commands for drafting said pattern for said garments;

providing an apparel selecting and pattern drafting program adaptable for execution within said processor unit, wherein said apparel selecting and pattern drafting program accesses said design database to control sequential operation of an apparel selecting and pattern drafting procedure;

choosing a garment design;

modifying and/or substituting one or more of said garment features of said garment design to form a modified garment design;

providing body dimensions, said body dimensions including a set of critical measurements to allow a customized pattern of said modified garment design to be drafted;

analyzing the fit of said garment to be created from said pattern based on said body dimensions; and drafting said pattern.

7. The method of claim 6, wherein the step of providing body dimensions further comprises providing a set of preferable measurements which allow said pattern to be individualized.

8. The method of claim 6, further comprising the step of selecting a fabric for said garment.

9. The method of claim 8, wherein said apparel selecting and pattern drafting program automatically adjusts the dimensions of said pattern based upon said fabric selection.

10. The method of claim 8, wherein said output device prints said pattern on said fabric to permit easy matching of the pattern to said fabric.

11. The method of claim 6, wherein said input device and said display device cooperate to permit modification of said pattern.

12. The method of claim 11, wherein said modification comprises a drag and drop feature.

13. The method of claim 6, wherein said apparel selecting and pattern drafting program further comprises garment design limits to prevent the drafting of patterns that would result in aesthetically unpleasing garments.

\* \* \* \* \*